US008717948B2

(12) United States Patent
Kern

(10) Patent No.: US 8,717,948 B2
(45) Date of Patent: May 6, 2014

(54) TECHNIQUE FOR PROVIDING AN ASYMMETRIC MULTIPOINT CALL BETWEEN A PLURALITY OF NETWORK NODES

(75) Inventor: András Kern, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 124 days.

(21) Appl. No.: 13/382,030

(22) PCT Filed: Jul. 16, 2009

(86) PCT No.: PCT/EP2009/005191
§ 371 (c)(1),
(2), (4) Date: Feb. 28, 2012

(87) PCT Pub. No.: WO2011/006520
PCT Pub. Date: Jan. 20, 2011

(65) Prior Publication Data
US 2012/0170491 A1 Jul. 5, 2012

(51) Int. Cl.
*H04L 12/16* (2006.01)
*H04M 3/56* (2006.01)

(52) U.S. Cl.
CPC .................................. *H04M 3/561* (2013.01)
USPC ......................................... 370/260; 370/312

(58) Field of Classification Search
CPC .. H04J 2203/0019; H04M 3/562; H04W 4/06
USPC ......... 370/389, 260, 261, 270, 265, 312, 400,
370/373, 377, 410, 384, 401, 402
See application file for complete search history.

(56) References Cited

U.S. PATENT DOCUMENTS

| 6,771,633 | B1* | 8/2004 | Mizoguchi ..................... 370/345 |
| 6,785,246 | B2* | 8/2004 | Foti ................................ 370/261 |
| 2001/0051529 | A1 | 12/2001 | Davies |
| 2007/0183434 | A1 | 8/2007 | Pandey |
| 2008/0133687 | A1 | 6/2008 | Fok et al. |

FOREIGN PATENT DOCUMENTS

WO    WO 01/91384    11/2001

OTHER PUBLICATIONS

Distributed call and connection management (DCM), ITU-T Rec. G.7713/Y.1704, *International Telecommunication Union*, May 7, 2006—Prepublished version, p. 35.
Papadimitriou Alcatel A Farrel Old Dog Consulting D, "Generalized MPLS (GMPLS) RSVP-TE Signaling Extensions in Support of Calls", *IETF Standard, Internet Engineering Taskforce*, Aug. 1, 2007, p. 5D.

(Continued)

*Primary Examiner* — Brenda H Pham
(74) *Attorney, Agent, or Firm* — Nixon & Vanderhye, P.C.

(57) ABSTRACT

A technique for providing an asymmetric multipoint call between a plurality of network nodes (10, 12, 14, 16, 18) in a communication network supporting distributed call and connection management (DCM) features is provided, wherein a first call is established between a master node (10) and a first slave node (12) and a second call is established between the master node (10) and a second slave node (14). A method implementation of the technique comprises the steps of exchanging call management information for the asymmetric multipoint call between the master node (10) and the first slave node (12) based on the first call, exchanging call management information for the asymmetric multipoint call between the master node (10) and the second slave node (14) based on the second call, and excluding the first (12) and the second (14) slave node from directly exchanging call management information relating to the asymmetric management call between each other.

31 Claims, 8 Drawing Sheets

(56) References Cited

OTHER PUBLICATIONS

To-Multipoint TE Label Switched Paths (LSPs), *IETF Standard, Internet Engineering Taskforce*, May 1, 2007, p. 39.
International Search Report for PCT/EP2009/005191, mailed Apr. 23, 2010.
Written Opinion for PCT/EP2009/005191, mailed Apr. 23, 2010.
International Preliminary Report on Patentability for PCT/EP2009/005191, completed Oct. 31, 2011.

Distributed call and connection management (DCM), *International Telecommunication Union*, May 7, 2006, p. 35.
Papadimitriou Alcatel A Farrel Old Dog Consulting D, "Generalized MPLS (GMPLS) RSVP-TE Signaling Extensions in Support of Calls", *IETF Standard, Internet Engineering Taskforce*, Aug. 1, 2007, p. 5.
Aggarwal et al., "Extensions to Resource Reservation Protocol—Traffic Engineering (RSVP-TE for Point-to-Multipoint TE Label Switched Paths (LSPs)", *IETF Standard, Internet Engineering Taskforce*, May 1, 2007, p. 39.

* cited by examiner

TECHNIQUE FOR PROVIDING AN ASYMMETRIC MULTIPOINT CALL BETWEEN A PLURALITY OF NETWORK NODES

This application is the U.S. national phase of International Application No. PCT/EP2009/005191 filed 16 Jul. 2009 which designated the U.S., the entire contents of which is hereby incorporated by reference.

TECHNICAL FIELD

The present invention generally relates to the technical field of asymmetric multipoint calls. In particular, the invention relates to a technique for providing an asymmetric multipoint call between a plurality of network nodes in a communication network.

BACKGROUND

Document ITU-T G.807 "Requirements for automatic switched transport networks" by the ITU describes requirements for Automatic Switched Transport Networks (ASTN). This document has been withdrawn and its content has been merged into document ITU-T G.8080 "Architecture of the Automatic Switched Optical Network (ASON)" by the ITU describing an Automatic Switched Optical Network (ASON) architecture. ASTN and ASON essentially relate to the same network architecture.

Document ITU-T G.7713 "Distributed Call and Connection Management (DCM)" by the International Telecommunication Union (ITU) defines requirements for distributed calls and connection management of both the User Network Interface (UNI) and the Network Node Interface (NNI) in ASON/ASTN.

Document IETF/CCAMP RFC-4974 "Generalized MPLS (GMPLS) RSVP-TE Signalling Extensions in Support of Calls", August 2007, by D. Papadimitriou and A. Farrel defines protocol procedures and extensions to support calls within networks using Generalized Multiprotocol Label Switching (GMPLS) protocols. In this document, a call is defined as an association between endpoints to support an instance of a network service. GMPLS can be used on a control plane for ASON/ASTN networks supporting DCM features. Accordingly, in communication networks supporting DCM features and using GMPLS protocols, a point-to-point call establishes a relationship between two endpoints based on which subsequent point-to-point connections may be generated.

Other communication technologies, like Multiprotocol Label Switching (MPLS) and Provider Backbone Bridging with Traffic Engineering (PBB-TE), support multipoint services in which more than two endpoints support an instance of a network service. However, the GMPLS point-to-point call concept does not support multipoint services using point-to-multipoint connections. In particular, the GMPLS point-to-point call concept does not support assigning multiple calls to the same network connection.

SUMMARY

Accordingly, there is a need for a technique for providing an asymmetric multipoint call between a plurality of network nodes in a communication network, which is avoiding at least some of the disadvantages outlined above.

This need is satisfied according to a first aspect by a method for providing an asymmetric multipoint call between a plurality of network nodes in a communication network supporting DCM features, wherein a first call is established between a master node and a first slave node and a second call is established between the master node and a second slave node, the method comprising the steps of exchanging call management information for the asymmetric multipoint call between the master node and the first slave node based on the first call, exchanging call management information for the asymmetric multipoint call between the master node and the second slave node based on the second call, and excluding the first and second slave node from directly exchanging call management information relating to the asymmetric multipoint call between each other.

According to a second aspect, a method for providing an asymmetric multipoint call between a plurality of network nodes in a communication network supporting DCM features is provided, wherein calls are established between a master node and multiple slave nodes, and wherein the method comprises the steps performed by a first slave node of exchanging call management information for the asymmetric multipoint call with the master node based on a first call established between the master node and the first slave node, and excluding the first slave node from directly exchanging call management information relating to the asymmetric multipoint call with one or more other slave nodes participating in the asymmetric multipoint call.

The asymmetric multipoint call is based on an association between at least three endpoints, i.e., the master node, the first slave node and the second slave node, for supporting a network service instance, e.g., a multipoint service. The asymmetry of the asymmetric multipoint call lies in the different data exchange provided between the master node and the first and second slave node. In the asymmetric multipoint call, call management information is only exchanged between the master node and the first and the second slave node, however, not directly between the first and the second slave node bypassing the master node.

The communication network supporting DCM features may be a network using the protocol specifications as defined in document ITU-T G.7713 "Distributed Call and Connection Management DCM" by the ITU. In particular, the communication network may be a data communication network in which functional entities regarding call management and connection management are implemented in a plurality of network nodes of the communication network, wherein connection and call management is performed based on an interoperation of the functional entities. The communication network may also be an ASTN and/or an ASON supporting DCM features, or an ASTN and/or an ASON supporting DCM features and using at least one GMPLS protocol. The master node, the first slave node and the second slave node may be any kind of active electronic devices that are attached to the communication network and are capable of sending, receiving and/or forwarding information via communication links.

The call management information exclusively exchanged between the master node and the first and the second slave node may comprise identification information uniquely identifying the asymmetric multipoint call. Based on the identification information, an asymmetric multipoint call can be identified globally, i.e., domain wide, within the communication network.

For uniquely identifying the asymmetric multipoint call within the communication network, the identification information may comprise information regarding at least one of the network nodes participating in the asymmetric multipoint call, regarding the master node of the asymmetric multipoint call, and regarding a local identifier of the asymmetric multipoint call. Based on the local identifier, different asymmetric multipoint calls having the same endpoints (e.g., the master node and the first and the second slave node) can be distinguished.

The identification information may alternatively or additionally comprise information regarding slave nodes participating in the asymmetric multipoint call, e.g., a slave node list. Thereby, extended call information may be exchanged, e.g., for synchronization procedures.

Since no call management information for the asymmetric multipoint call is directly exchanged between the first and the second slave node, the first slave node has no information regarding the status of the second slave node. In particular, the first slave node has no information regarding whether the second slave node has disconnected from the asymmetric multipoint call or a further slave node has joint the asymmetric multipoint call. Therefore, the method may comprise the further step of receiving, by at least the first slave node, notifications of changes of the identification information from the master node. In particular, the method may comprise the step of receiving, by at least the first slave node, information regarding slave nodes participating in the asymmetric multipoint call, e.g., a list of slave nodes, from the master node. These notifications may be provided periodically by the master node to the first slave node. For scalability reasons, the notifications may only comprise information regarding status changes. In this case, the first slave node may send an acknowledge message in response to a received notification to the master node.

Call management information is communicated via the master node to the slave nodes. Accordingly, failure of the master node may disrupt the asymmetric multipoint call. Therefore, the method may comprise the further steps, performed by at least the first slave node, of receiving failure information regarding failure of the master node, and sending in response to the received failure information call invitation messages including the identification information uniquely identifying the asymmetric multipoint call to network nodes participating in the asymmetric multipoint call. Thereby, one of the slave nodes participating in the asymmetric multipoint call may replace the master node and take over its responsibilities so that the asymmetric multipoint call can be maintained.

In order to avoid an interruption of active network connections, the method may further comprise the steps of determining whether the first slave node participates in any network connection with other network nodes implementing the asymmetric multipoint call, and leaving, by at least the first slave node, the asymmetric multipoint call in case no participation is determined. The first slave node leaving the asymmetric multipoint call may be triggered by the master node. The first slave node may also on its own decide to disconnect from the asymmetric multipoint call. In case a participation in a network connection is determined, the first slave node leaving the asymmetric multipoint call may be delayed until the active network connection is disconnected.

For establishing a new call instance, e.g., an asymmetric multipoint call, with the master node, the method may comprise the further step of sending a call join request message to the master node, the message comprising an identifier indicating whether a call, which is independent of the currently provided asymmetric multipoint call, is to be established. The call join request message may be sent by the first or the second slave node or another slave node not participating in the current asymmetric multipoint call to the master node. Based on the identifier, the master node can recognize whether another network node wants to join the asymmetric multipoint call or the other network node wants the master node to join another call, e.g., another asymmetric multipoint call as a master node.

According to a third aspect, a method for providing an asymmetric multipoint call between a plurality of network nodes in a communication network supporting DCM features is provided, wherein a first call is established between a master node and a first slave node, a second call is established between the master node and a second slave node, and the first and the second slave node are excluded from directly exchanging call management information relating to an asymmetric multipoint call between each other, wherein the method comprises the steps performed by the master node of exchanging call management information for the asymmetric multipoint call with the first slave node based on the first call and exchanging call management information for the asymmetric multipoint call with the second slave node based on the second call.

For extending the asymmetric multipoint call to a further slave node, the method may comprise the steps, performed by the master node, of receiving a call join request message from a third slave node, the message comprising identification information uniquely identifying a specific asymmetric multipoint call, determining whether the received call join request message belongs to the asymmetric multipoint call currently provided, and allowing the third slave node to join the currently provided asymmetric multipoint call when it has been determined that the received call join request message belongs to the currently provided asymmetric multipoint call. According to this aspect, the third slave node triggers the joining of the asymmetric multipoint call.

In case the third slave node does not intend to join the current asymmetric multipoint call, the method may comprise the step of establishing a third call, which is independent of the currently provided asymmetric multipoint call, between the master node and the third slave node when it has been determined that the received call join request message does not belong to the currently provided asymmetric multipoint call. Accordingly, a new call (e.g., a new asymmetric multipoint call or point-to-point call) may be established between the master node and the third slave node.

The trigger for another node joining the current asymmetric multipoint call or for establishing a new call (e.g., a new asymmetric multipoint call or point-to-point call) may also be provided by the master node. Accordingly, the method may comprise the step of sending a call invitation message to a fourth slave node, the message comprising identification information uniquely identifying the currently provided asymmetric multipoint call and an identifier indicating whether a call, which is independent of the currently provided asymmetric multipoint call, is to be established. This step may be provided by the master node. During the sending of the call invitation message, the fourth slave node may not be connected to the asymmetric multipoint call. Thus, the currently provided asymmetric multipoint call may be extended by the fourth slave node or a new call between the master node and the fourth slave node may be established.

In order to keep slave nodes participating in the asymmetric multipoint call informed about other slave nodes participating in the asymmetric multipoint call, the method may comprise the further step of reporting changes of identification information uniquely identifying the asymmetric multipoint call to the first and the second slave node. The changes may be distributed periodically and/or event-based by the master node to slave nodes, in particular, all slave nodes, participating in the asymmetric multipoint call.

The first slave node may be configured to only disconnect from the asymmetric multipoint call in case it is not involved in any active network connection regarding the asymmetric multipoint call. However, the master node may want to immediately release the first slave node from the asymmetric multipoint call. For this, the method may comprise the further steps, performed by the master node, of sending a call disconnect message for disconnecting the first call to the first slave node, receiving a call disconnect refuse message from the first slave node, and sending in response to the call disconnect refuse message a connection release message to the first slave node, wherein the connection release message triggers the first slave node to disconnect all connections with other network nodes relating to the asymmetric multipoint call.

According to another aspect, a computer program product is provided. The computer program includes program code portions for performing one or more of the steps or one or more of the method aspects described herein, when the computer program product is executed on one or more components of the communication network. The computer program product may be stored on a computer-readable recording medium such as a permanent or re-writable memory, a CD-Rom, or a DVD. The computer program product may also be provided for download via one or more computer networks, such as the Internet, a cellular telecommunication network or a wireless or wired LAN.

According to a first hardware aspect, a communication network supporting DCM features is provided. The communication network comprises a first slave node configured to be excluded from directly exchanging call management information relating to an asymmetric multipoint call with another slave node participating in the asymmetric multipoint call, a second slave node configured to be excluded from directly exchanging call management information relating to an asymmetric multipoint call with another slave node participating in the asymmetric multipoint call, and a master node configured to exchange call management information for an asymmetric multipoint call between the master node and the first slave node based on a first call and to exchange call management information for the asymmetric multipoint call between the master node and the second slave node based on a second call.

As for a second hardware aspect, a slave node configured to participate in an asymmetric multipoint call between a plurality of network nodes in a communication network supporting DCM features is provided, wherein multiple calls are established between a master node multiple slave nodes. The slave node comprises a communication unit configured to exchange call management information for the asymmetric multipoint call with the master node based on a first call established between the master node and the first slave node and a management unit configured to exclude the slave node from directly exchanging call management information relating to the asymmetric multipoint call with one ore more other slave nodes participating in the asymmetric multipoint call. The call management information may comprise information uniquely identifying the asymmetric multipoint call and the communication unit may be configured to receive changes of the identification information from the master node.

As for a third hardware aspect, a master node configured to participate in an asymmetric multipoint call between a plurality of network nodes in a communication network supporting DCM features is provided, wherein a first call is established between the master node and a first slave node, a second call is established between the master node and a second slave node, and the first and the second slave node are excluded from directly exchanging call management information relating to the asymmetric multipoint call between each other. The master node comprises a communication unit configured to exchange call management information for the asymmetric multipoint call with the first slave node based on the first call and to exchange call management information for the asymmetric multipoint call with the second slave node based on the second call.

The master node may further comprise a receiving unit configured to receive a call join request message from a third slave node, the message comprising information uniquely identifying a specific asymmetric multipoint call, a determination unit configured to determine whether the received call join request message belongs to the currently provided asymmetric multipoint call, and a management unit configured to allow the third slave node to join the currently provided asymmetric multipoint call when it has been determined that the received call join request message belongs to the currently provided asymmetric multipoint call.

BRIEF DESCRIPTION OF THE DRAWINGS

In the following, the invention will be described with reference to exemplary embodiments illustrated in the drawings, wherein.

DETAILED DESCRIPTION

In the following, for purposes of explanation of not limitation, specific details are set forth, such as particular sequences of steps, components and configurations, in order to provide a thorough understanding of the present invention. It will be apparent to one skilled in the art that the present invention may be practiced in other embodiments that depart from these specific details. For example, while the embodiments will be described with reference to network nodes provided in an ASTN network, it will be apparent to the skilled person that the invention can also be practiced in context with network nodes provided in other communication networks, i.e., networks which are working in accordance with other communication standards.

Moreover, those skilled in the art will appreciate that functions and processes explained herein below may be implemented using software functioning in conjunction with programmed microprocessors or general-purpose computers. It will also be appreciated that while the embodiments are primarily described in the form of methods and apparatuses, the invention may also be embodied in a computer program product as well in a system comprising a computer processor and a memory coupled to the processor, wherein the memory is encoded with one or more programs that may perform the functions disclosed herein.

Figure 1:
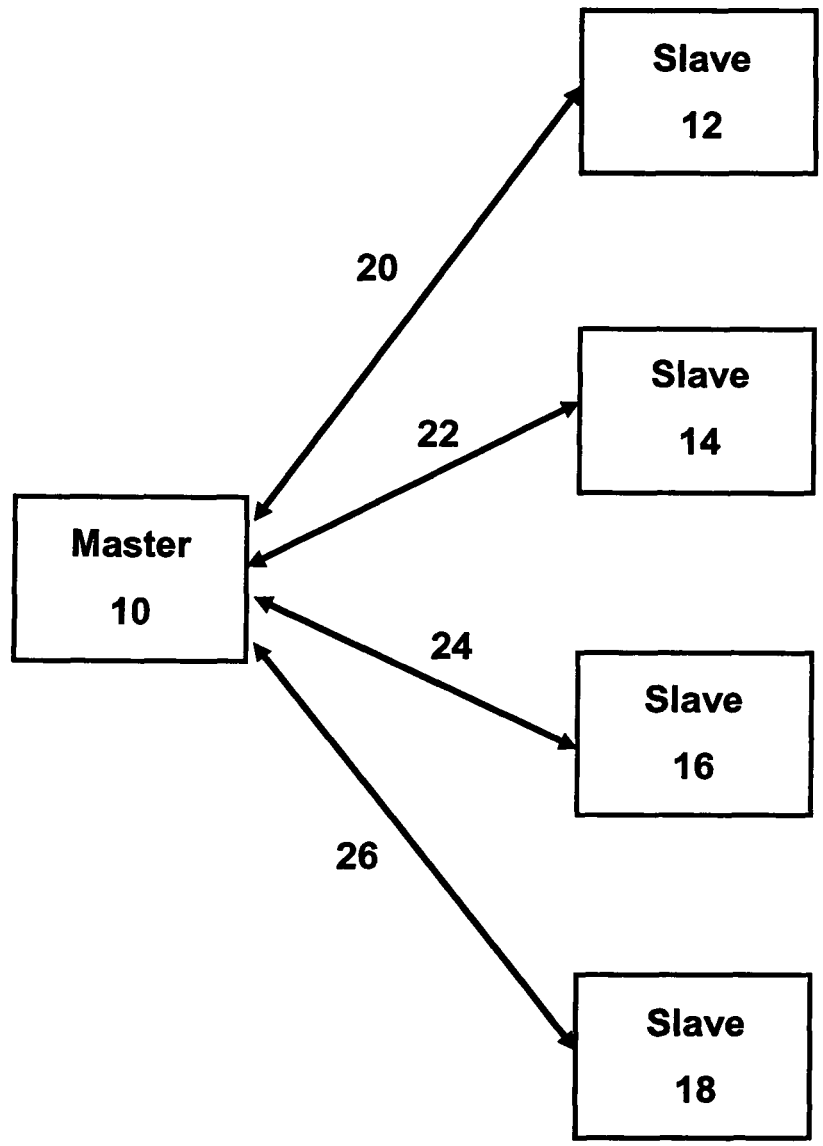
FIG. 1 is a schematic block diagram showing an embodiment of a communication network.

FIG. 1 shows a schematic block diagram illustrating an embodiment of a communication network comprising a master node 10, a first slave node 12, a second slave node 14, a third slave node 16, and a fourth slave node 18. The network is an ASTN supporting DCM features and using a GMPLS protocol. Master node 10 is communicating via communication links 20, 22, 24 and 26 with slave nodes 12, 14, 16 and 18. In particular, logical calls may be established between communication links 20, 22, 24, 26. Communication links 20, 22, 24, 26 may be direct network links. The network connections of communication links 20, 22, 24, 26 may also be provided via further network nodes not shown in FIG. 1. Moreover, communication links 20, 22, 24, 26 may comprise wired and/or wireless communication links.

Figure 2:
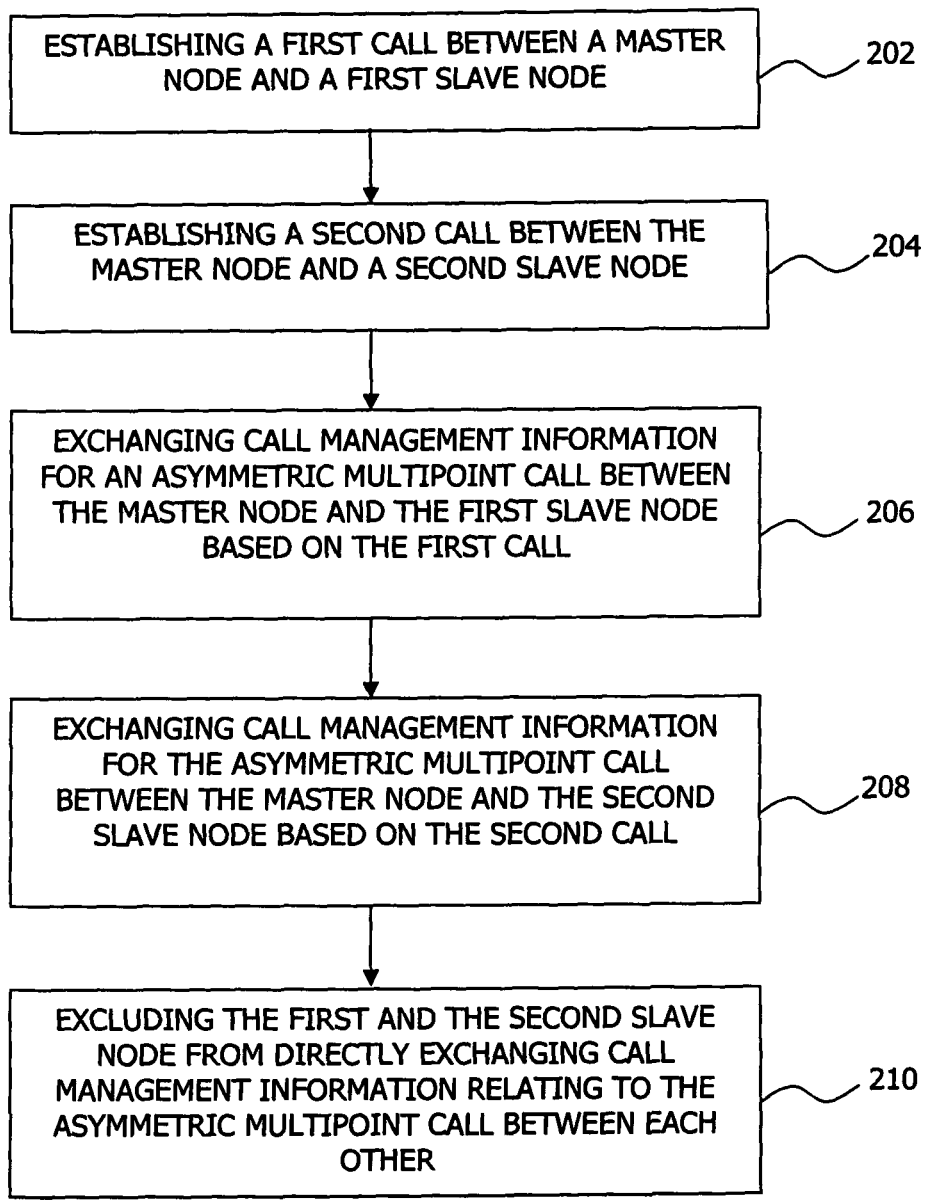
FIG. 2 is a flow chart showing a first embodiment of a method for providing an asymmetric multipoint call.

FIG. 2 shows a flow chart 200 illustrating a first embodiment of a method for providing an asymmetric multipoint call. The method will be explained with reference to the communication network of FIG. 1.

The method 200 starts in step 202 by establishing a first call between master node 10 and first slave node 12. The first call is logical connection capable of defining a multipoint network service instance. Thereafter, in step 204, a second call is established between master node 10 and second slave node 14. In step 206, based on the first call, call management information for an asymmetric multipoint call is exchanged between master node 10 and first slave node 12. The exchanged call management information comprises an Endpoint Group Identifier (EGI), a Master Node Identifier (MNI), and a Local Call Delimiter (LCD). Based on the EGI, MNI and LCD values, the asymmetric multipoint call can be unambiguously identified within the communication network. In particular, based on the LCD value, different call having the same endpoints can be differentiated.

Thereafter, in step 208, call management information for the asymmetric multipoint call is exchanged between master node 10 and second slave node 14 based on the second call. The call management information exchanged between master node 10 and second slave node 14 as well comprises EGI, MNI and LCD values for the asymmetric multipoint call. In step 210, which can also be performed as an initial step, first slave node 12 and second slave node 14 are excluded from directly exchanging call management information relating to the asymmetric multipoint call between each other. In particular, the call management information is only exchanged via master node 10 between first slave node 12 and second slave node 14. The further slave nodes 16 and 18 may also participate in the asymmetric multipoint call and exchange call management information with master node 10. However, no call management information is directly exchanged between slave nodes 12, 14, 16 and 18 bypassing master node 10.

According to this embodiment, master node 10 is in charge of the asymmetric multipoint call and has all information regarding the asymmetric multipoint call available. Therefore, efficient control of the asymmetric multipoint call can be provided. Moreover, by using the point-to-point connections 20, 22, 24 and 26 for an asymmetric multipoint call, multipoint services can be efficiently supported. Furthermore, the asymmetric multipoint call concept shown in FIGS. 1 and 2 also supports point-to-point calls between two endpoint nodes.

Figure 3:
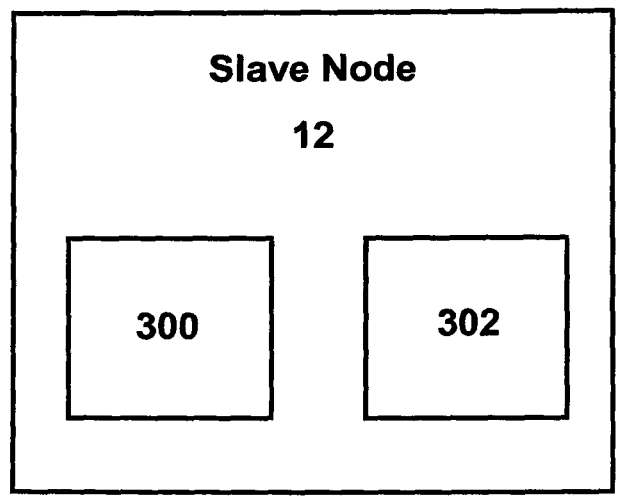
FIG. 3 is a schematic block diagram illustrating an embodiment of a slave node.

FIG. 3 shows a schematic block diagram illustrating an embodiment of slave node 12 shown in FIG. 1. Slave node 12 comprises a communication unit 300 and a management unit 302 and is capable of communicating in a communication network supporting DCM features. Further components not shown in FIG. 3 may be included in slave node 12. Slave nodes 14, 16 and 18 shown in FIG. 1 may have the same structure.

Figure 4:
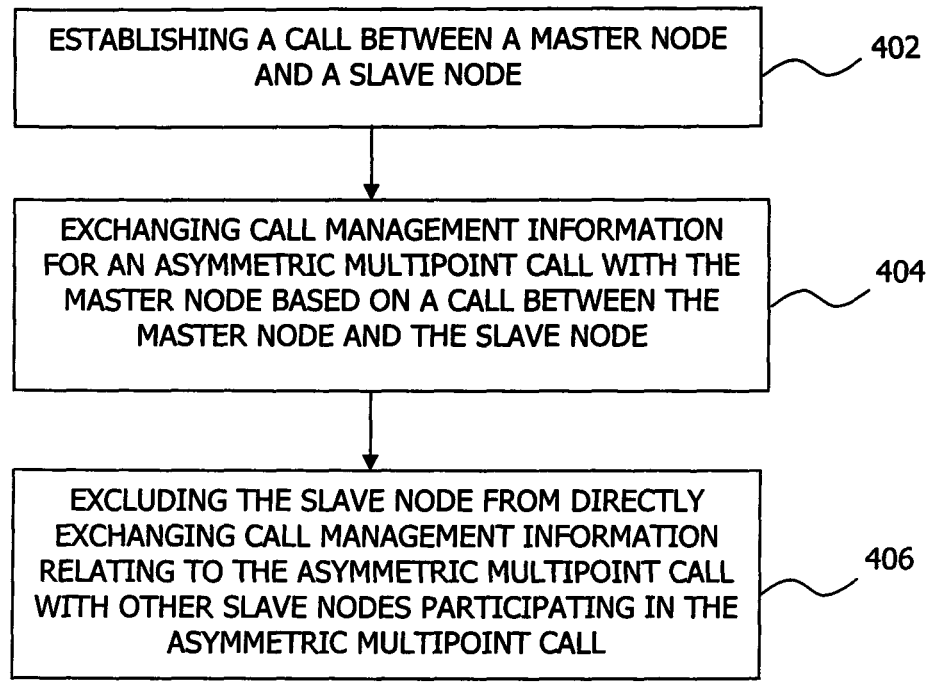
FIG. 4 is a flow chart showing a second embodiment of a method for providing an asymmetric multipoint call.

FIG. 4 shows a flow chart 400 illustrating a second embodiment of a method for providing an asymmetric multipoint call between a plurality of network nodes. The method will be explained with reference to master node 10 and slave nodes 12, 14, 16 and 18 shown in FIGS. 1 and 3.

The method starts in step 402 by establishing a call between master node 10 and slave node 12. Further calls for an asymmetric multipoint call are established between master node 10 and slave nodes 14, 16 and 18. In subsequent step 404, communication unit 300 of slave node 12 exchanges call management information for the asymmetric multipoint call with master node 10 based on the call established between master node 10 and slave node 12. The call management information comprises EGI, MNI and LCD values. In step 406, which can also be performed as an initial step, management unit 302 of slave node 12 excludes slave node 12 from directly exchanging call management information relating to the asymmetric multipoint call with the other slave nodes 14, 16 and 18 participating in the asymmetric multipoint call.

According to this embodiment, slave node 12 supports master node 10 in controlling the asymmetric multipoint call. By avoiding call management information bypassing of master node 10, the asymmetric multipoint call can be more efficiently controlled.

Figure 5:
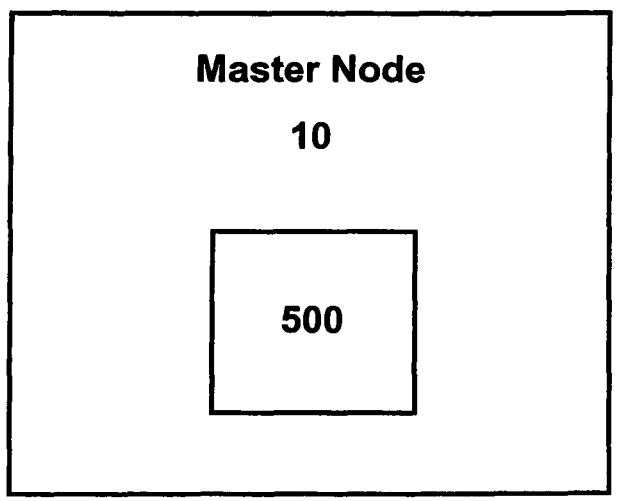
FIG. 5 is a schematic block diagram illustrating an embodiment of a master node.

FIG. 5 shows a schematic block diagram illustrating an embodiment of master node 10 shown in FIG. 1. Master node 10 is configured to control an asymmetric multipoint call with a plurality of slave nodes in a communication network supporting DCM features and comprises a communication unit 500. Further components not shown in FIG. 5 may be included in master node 10.

Figure 6:
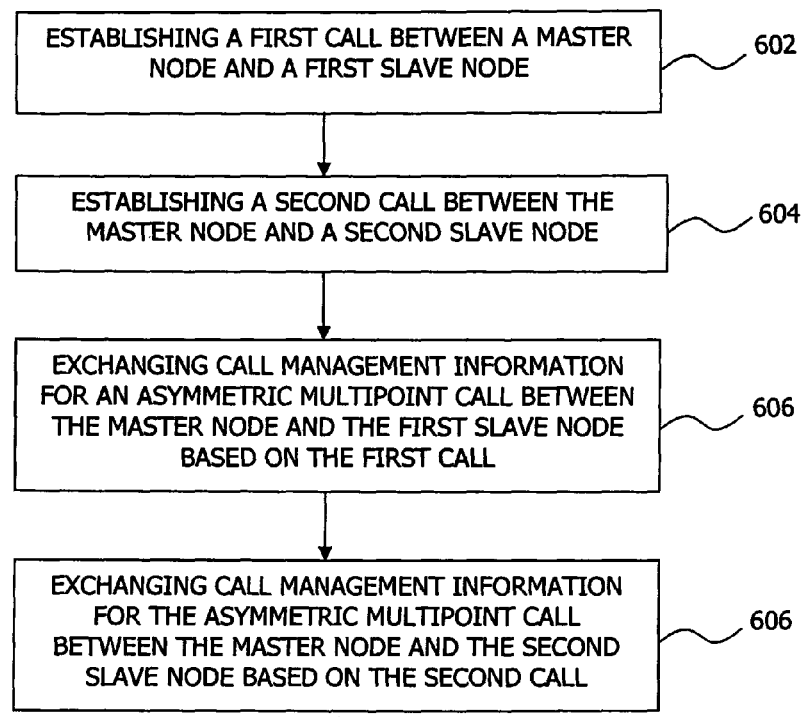
FIG. 6 is a flow chart showing a third embodiment of a method for providing an asymmetric multipoint call.

FIG. 6 shows a flowchart 600 illustrating a third embodiment of a method for providing an asymmetric multipoint call between a plurality of network nodes in a communication network. The method will be explained with reference to master node 10 and slave nodes 12, 14, 16 and 18 shown in FIGS. 1, 3 and 5.

The method starts in step 602 by establishing a first call between master node 10 and first slave node 12. Thereafter, in step 604, a second call is established between master node 10 and second slave node 14. In subsequent step 606, call management information for an asymmetric multipoint call is exchanged between master node 10 and first slave node 12 based on the first call. In step 608, call management information for the asymmetric multipoint call is further exchanged between master node 10 and second slave node 14 based on the second call. The call management information comprises EGI, MNI and LCD values. Further calls may be established between master node 10 and slave nodes 16 and 18. Based on these further calls, call management information may be exchanged between master node 10 and slave nodes 16 and 18. However, no call management information is directly exchanged between slave nodes 12, 14, 16 and 18 bypassing master node 10.

Master node 10 controls the relation between calls supporting the same network service instance. In particular, multiple calls may identify the same network service instance. Thereby, multipoint services may be efficiently implemented using point-to-multipoint connections.

In the following an embodiment of a master node controlled asymmetric multipoint call will be explained with reference to FIG. 1. This embodiment can be combined with any of the embodiments discussed above. According to this embodiment, master node 10 controls asymmetric multipoint call instances using Call Invitation messages and Call Disconnect messages. The Call Invitation and Call Disconnect messages may be implemented based on Resource Reservation Protocol with Traffic Engineering extensions (RSVP-TE) signalling objects.

For inviting slave node 18 to an existing asymmetric multipoint call between master node 10 and slave nodes 12, 14 and 16, master node 10 sends a Call Invitation message as a call invitation request to slave node 18. Slave node 18 decides whether it accepts or refuses the call invitation request and replies with a call invitation response message. In case slave node 18 accepts the call invitation request, it becomes a slave node within the asymmetric multipoint call between master node 10 and slave nodes 12, 14 and 16. In case slave node 18 refuses the invitation or sends no response to master node 10, slave node 18 does not join the asymmetric multipoint call.

Based on a Call Disconnect message, master node 10 can cause a slave node to leave a call, e.g., slave node 16 to leave the asymmetric multipoint call. If an ongoing network connectivity between master node 10 and slave node 16 exists, slave node 16 can either reject the Call Disconnect request and indicate to master node 10 that a network connectivity is still implemented or it may accept the Call Disconnect request and disconnect active network connections. In case no active network connections exist between master node 10 and slave node 16, slave node 16 may accept the Call Disconnect request. In the case slave nodes 16 rejects the Call Disconnect request, master node 10 may close active network connections and resend the Call Disconnect message.

In the following an embodiment of an endpoint controlled asymmetric multipoint call will be explained with reference to FIG. 1. This embodiment can be combined with any of the embodiments discussed above. In particular, the endpoint controlled asymmetric multipoint call concept may be provided additionally or alternatively to the above described master node controlled asymmetric multipoint call concept. The endpoint controlled asymmetric multipoint call concept enables a node to join an existing asymmetric multipoint call based on a Call Join message.

Node 16 intending to join an existing asymmetric multipoint call between master node 10 and slave nodes 12 and 14 sends a Call Join request to master node 10. The Call Join message includes EGI, MNI and LCD values for a specific asymmetric multipoint call. Master node 10 decides whether it accepts or refuses the Call Join request. Acceptance is signalled to node 16 based on a Call Join Accept message and refusal is signalled to node 16 by a Call Join Refuse message or no response. In case a call identified by the EGI, MNI and LCD values included in the Call Join message is not known to master node 10, it interprets the Call Join message in that node 16 intends to establish a new call. Accordingly, a new call may be created in case master node 10 accepts the Call Join request from node 16. In this case, node 16 establishes the new call, e.g., an asymmetric multipoint call, and becomes the master node for this call.

The forgoing embodiment is based on identifier matching, i.e., master node 10 assumes that node 16 has sufficient information regarding the EGI, MNI and LCD values identifying the current asymmetric multipoint call available. Therefore, if the EGI, MNI and LCD values transmitted in the Call Join message correspond to the current asymmetric multipoint call, master node 10 automatically treats the Call Join request message as a join request to the current asymmetric multipoint call. Accordingly, if a new call is identified by the EGI, MNI and LCD values included in the Call Join message, master node 10 interprets the Call Join message as a request for establishing a new call.

According to another embodiment (which can be combined with any of the embodiments described above), node 16 intends to join an existing asymmetric multipoint call between master node 10 and slave nodes 12 and 14 as a slave node. However, according to this embodiment, node 16 does not have sufficient information regarding the EGI, MNI and LCD values of the existing asymmetric multipoint call. Thus, node 16 includes arbitrary EGI, MNI and/or LCD values in the Call Join message to be sent to master node 10. In this case, when master node 10 receives the Call Join message from node 16, it cannot determine whether node 16 wants to join the existing asymmetric multipoint call between master node 10 and slave nodes 12 and 14 (however, does not have the actual EGI, MNI and/or LCD values available), or wants to establish a new call.

This problem may be solved based on explicit indication, in which a one bit flag "Establishing New Call Instance (ENCI)" identifier is added to the Call Invitation message and/or the Call Join request message. If for example a Call Join message sent by node 16 to master node 10 includes an ENCI flag having the value "1", master node 10 knows that node 16 wants to establish a new call. In case the Call Join message includes an ENCI flag having the value "0", master node 10 knows that node 16 wants to join the existing asymmetric multipoint call, however, is not aware of the actual EGI, MNI and/or LCD values.

According to the endpoint controlled asymmetric multipoint call concept, a slave node participating in an asymmetric multipoint call may leave the call based on a Call Leave message. For example, slave node 18 sends a Call Leave message to master node 10. Thereafter, master node 10 checks whether slave node 18 is involved in any network connections regarding the asymmetric multipoint call. If this is the case, master node 10 rejects the request. Master node 10 may alternatively cause a disconnection of network connections with slave node 18 by sending a Disconnect a Call message to slave node 18.

In the following, an embodiment regarding synchronizing the states of network nodes participating in an asymmetric multipoint call is explained with reference to FIG. 1. This embodiment can be combined with any of the embodiments described above. According to this embodiment, a State Synchronization procedure is implemented within network node 10.

The call management information according to this embodiment (i.e., the EGI, MNI and LCD values) does not comprise information on the slave nodes 12, 14, 16 and 18 participating in the asymmetric multipoint call. Therefore, slave nodes 12, 14, 16 and 18 are not aware of other slave nodes 12, 14, 16 and 18 participating in the asymmetric multipoint call. Hence, slave nodes 12, 14, 16 and 18 cannot establish direct network connections between each other, however, only with master node 10.

To solve this problem, the call management information (i.e., the EGI, MNI and LCD values) is extended with a list of slave nodes 12, 14, 16 and 18 participating in the asymmetric multipoint call to extended call management information. Since call management information is exchanged with master node 10, master node 10 can distribute changes of the list of slave nodes along with the EGI, MNI and LCD values (i.e., the extended call management information) to slave nodes 12, 14, 16 and 18 participating in the asymmetric multipoint call. For example, if master node 10 detects that slave node 16 has disconnected from the current asymmetric multipoint call, it forwards this information to the remaining slave nodes 12, 14 and 18. The remaining slave nodes 12, 14 and 18 can accordingly update its local lists.

When implementing the State Synchronization procedure within the communication network shown in FIG. 1, the above defined Call Join message, Call Invitation message and Call Leave message are not affected. However, the Call Disconnect message is affected, since master node 10 may not be aware of network connections provided between slave nodes 12, 14, 16 and 18. Such network connections may be provided for communicating other information than call management information between slave nodes 12, 14, 16 and 18. If for example a network connection between slave nodes 12 and 14 exists and master node 10 sends a Call Disconnect message to slave node 12, slave node 12 may refuse the Call Disconnect request and indicate to master node 10 that a network connection still exists. For handling this situation, a Release Connections message is provided. The Release Connections message is sent by master node 10 to slave node 12. Upon receipt of the Release Connections message, slave node 12 disconnects all connections relating to the asymmetric multipoint call. Thereafter, slave node 12 sends a message confirming the connections release to master node 10.

For asymmetric multipoint calls (i.e., contrary to point-to-point calls), it is possible that certain parts of the asymmetric multipoint call are implemented with network connections, while other parts of the asymmetric multipoint call are not implemented with network connections. Accordingly, a node (master or slave) can be disconnected from an asymmetric multipoint call if the respective node does not participate in any network connections (i.e., point-to-point or multipoint connections). For taking this aspect into consideration, an "Add a Connection to the Call" operation and a "Remove a connection from the Call" operation are provided. The Add a Connection to the Call operation establishes a network connection for implementing an asymmetric multipoint call and allocates the network connection to the call. The Remove a connection from the Call operation removes a network connection implementing an asymmetric multipoint call from the call. Thereafter, the network connection may be released.

In the following, embodiments concerning network node failure are explained with reference to FIG. 1. These embodiments can be combined with any of the embodiments described above. During network operation, slave nodes 12, 14, 16 and 18 and master node 10 may stop operation due to failure. In case any of slave nodes 12, 14, 16, 18 fails, network connections terminating at the failed slave node are released. For example, master node 10 may detect that slave node 14 fails and may send a message encoding this information to the other slave nodes 12, 16 and 18 still participating in the asymmetric multipoint call. This update may be provided based on the State Synchronization procedure described above.

In case master node 10 stops operation due to failure and no State Synchronization procedure is implemented within the communication network, the failure will cause a release of all network connections belonging to the asymmetric multipoint and an interruption of the asymmetric multipoint call.

Figure 7:
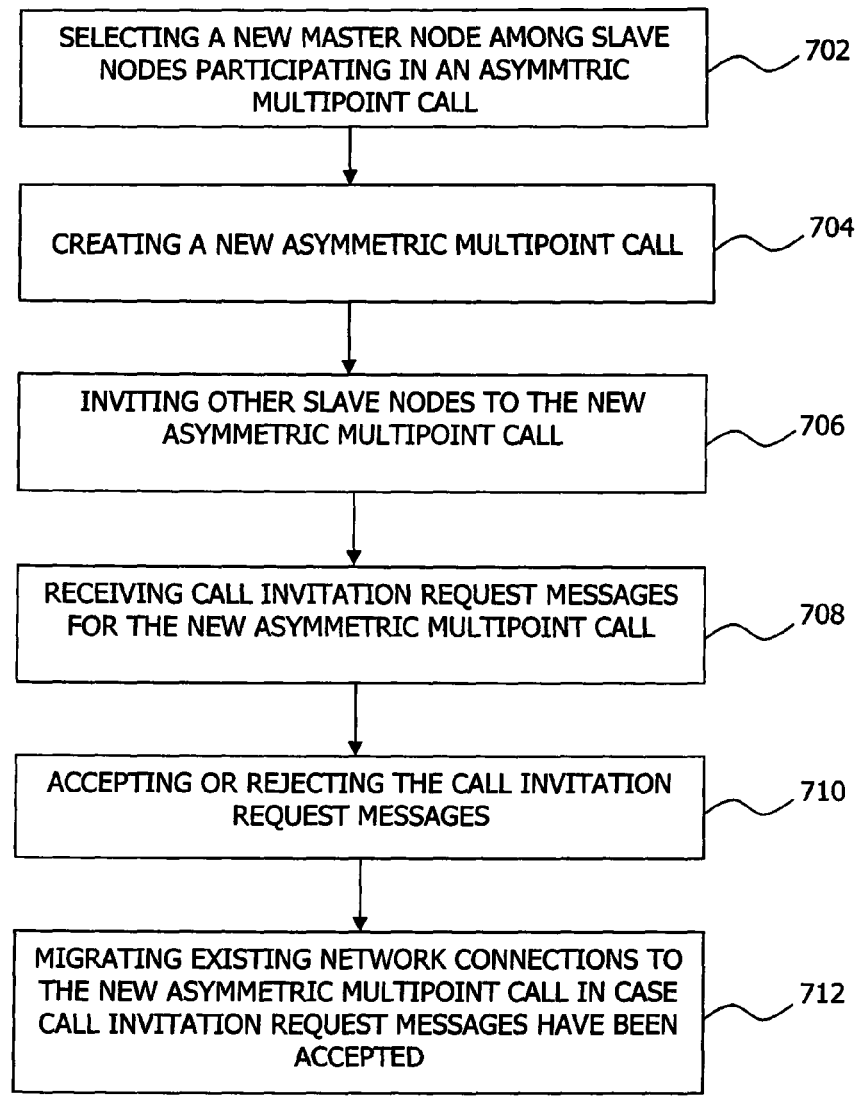
FIG. 7 is a flow chart showing an embodiment of a method for handling master node failure in case a state synchronization procedure is implemented.

However, in case the State Synchronization procedure is implemented within the communication network, the asymmetric multipoint call may continue with the remaining slave nodes 12, 14, 16 and 18. FIG. 7 shows a flow chart 700 illustrating an embodiment of a method for handling master node failure in case the State Synchronization procedure is implemented. The method may be executed by master node 10 and/or slave nodes 12, 14, 16 and 18 shown in FIG. 1.

After a failure of master node 10 has been detected, in step 702, a new master node is selected among slave nodes 12, 14, 16 and 18 participating in the asymmetric multipoint call. For this, the slave node having a lowest MNI value (i.e., slave node 12) is selected to become the new master node. Since all slave nodes 12, 14, 16 and 18 have a list of slave nodes participating in the asymmetric multipoint call together with the EGI, NMI and LCD values due to the implemented State Synchronization procedure, this selection based on the identifier of the slave node is possible.

Thereafter, in step 704, the new master node 12 creates a new asymmetric multipoint call. In subsequent step 706, the new master node 12 invites the other slave nodes 14, 16 and 18 based on Call Invitation messages to the new asymmetric multipoint call. The identifiers EGI, MNI and LCD of the disrupted asymmetric multipoint call may be embedded in an object transmitted within in the Call Invitation messages. In step 708, slave nodes 14, 16 and 18 receive the Call Invitation messages including the identifiers EGI, MNI and LCD of the disrupted asymmetric multipoint call. Thereafter, in step 710, slave nodes 14, 16 and 18 accept or refuse the invitation to the new asymmetric multipoint call.

In case a slave node 14, 16, 18 has accepted the invitation to the new asymmetric multipoint call, in step 712, network connections belonging to the disrupted asymmetric multipoint call are migrated to the new asymmetric multipoint call. Since changing a connection-to-call assignment of an existing network connection is not possible, the migration may be implemented by signalling of new network connections replacing existing network connections based on a so called "make-before-break" concept. Thereby, disruption of data plane connectivity can be prevented.

Figure 8:
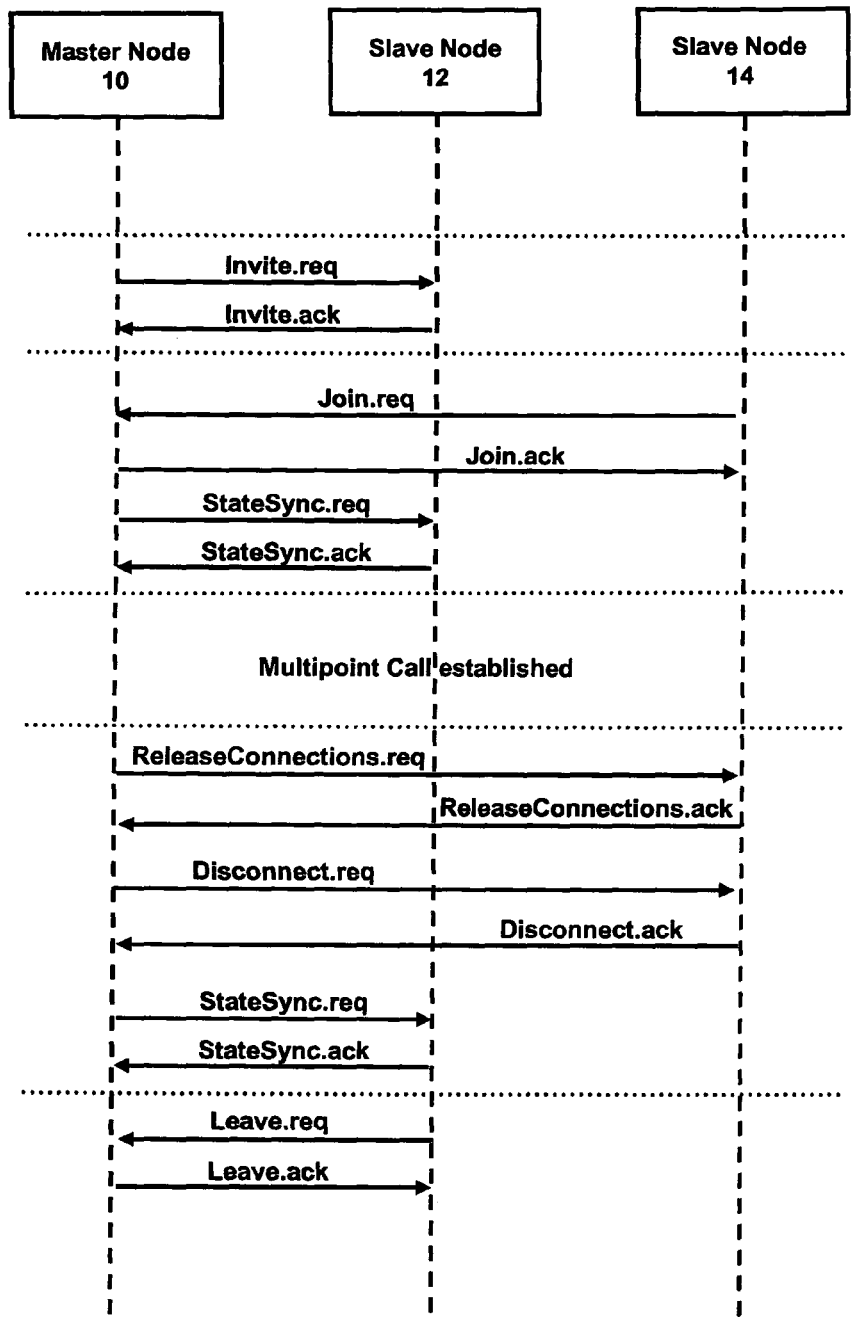
FIG. 8 is a diagram showing a further embodiment of a method for providing an asymmetric multipoint call.

FIG. 8 shows a diagram illustrating a further embodiment of a method for providing an asymmetric multipoint call. This embodiment can be combined with any of the embodiments described above. The embodiment of FIG. 8 relates to an endpoint controlled asymmetric multipoint call in which a State Synchronization procedure is implemented. The communication network schematically shown in FIG. 8 comprises a master node 10, a first slave node 12 and a second slave node 14. The communication network may correspond to the communication network of FIG. 1.

Initially, master node 10 initiates an asymmetric multipoint call procedure. For this, master node 10 determines the EGI, MNI and LCD identifiers for an asymmetric multipoint call. Thereafter, master node 10 invites first slave node 12 with an Invite.req message to the asymmetric multipoint call. First slave node 12 accepts the invitation with an Invite.ack response message. Thereafter, Call Join and State Synchronization are provided. For this, the second slave node 14 requests to join the asymmetric multipoint call with a Join.req message. Master node 10 accepts this request and informs the second slave node 14 of its decision with a Join.ack message. Thereafter, the first slave node 12 is informed about the second slave 14 node joining the asymmetric multipoint call with a StateSync.req message which is sent by master node 10 to first slave node 12. First slave node 12 acknowledges receipt of this update with a StateSync.ack message. Thereafter, the asymmetric multipoint call is established and the network connections belonging to the asymmetric multipoint call are implemented.

After the asymmetric multipoint call has been established, master node 10 wants second slave node 14 to be disconnected from asymmetric multipoint call. For this, master node 10 sends a ReleaseConnections.req message to second slave node 14, which is acknowledged by a ReleaseConnections.ack message to master node 10. Thereafter, a Disconnect.req message is sent by master node 10 to second slave node 14, which is acknowledged by a Disconnect.ack message. Subsequently, state synchronization based on exchanging StateSync.req and StateSync.ack messages between master node 10 and first slave node 12 is provided.

Thereafter, first slave node 12 also wants to leave the asymmetric multipoint call. Therefore, it sends a Leave.req message to master node 10. Master node 10 acknowledges this request with a Leave.ack message. Subsequent state synchronization is not required, since first slave node 12 is the only remaining slave node of the asymmetric multipoint call.

In order to unambiguously identify an asymmetric multipoint call within a communication network, EGI, MNI and LCD values are transmitted in call management messages and control messages which are relating to network connections to be assigned to a call. In the following, embodiments for mapping the identifier values EGI, MNI and LCD to signalling objects are described. In these embodiments, the identifier values are mapped to bit fields of RSVP-TE signalling objects. These embodiments can be combined with any of the embodiments described above. In particular, the messages defined and described in the above embodiments can be implemented based on RSVP-TE signalling objects.

The first embodiment relates to an embedded identifier option which makes use of asymmetric multipoint calls being implemented based on multipoint connections or multicast trees. A signalling concept for multicast trees is described in document IETF/CCAMP RFC-4875 "Extensions to Resource Reservation Protocol—Traffic Engineering (RSVP-TE) for Point-to-Multipoint TE Label Switched Paths (LSPs)" by R. Aggarwal, D. Papadimitriou and S. Yasukawa.

According to the embedded identifier option, a one-to-one mapping between the asymmetric multipoint call identifiers and multicast tree identifiers may provided as shown in the following table:

| Multipoint call | Multicast tree identifier | Multicast tree object | Domain |
|---|---|---|---|
| Endpoint group ID | Point to multipoint ID | Point to multipoint Session | 32 bits |
| Master Node ID | IPv4 tunnel sender address | Point to multipoint Sender Template/flowspec | 32 bits |
| Local Call Delimiter | Unused 16 bit word | Point to multipoint Session | 16 bits |

The EGI and the MNI values are assigned to existing fields, while the LCD values are provided in a used 16 bit word of a point-to-multipoint session object. Since the master node corresponds to a router ID of the master node, the RSVP-TE protocol allows this bit field to be transported. Since LCD values are mapped to an undefined 16 bit word of a point-to-multipoint session object, a new version of the object may be required.

For the embedded identifier objection, a Multipoint Call Session object carrying the EGI and LCD values is provided. The Multipoint Call Session object has the following structure:

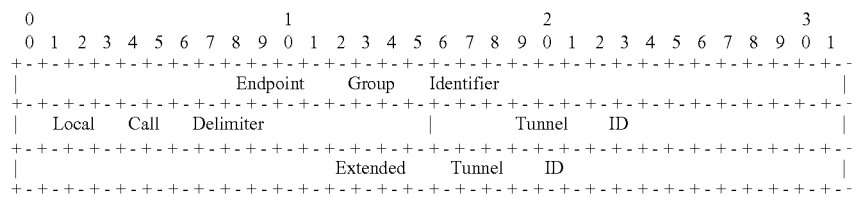

During call management operations, all further fields of the Multipoint Call Session object have to be set to zero for sending and have to be ignored for receiving. For a connection association operation, the further fields may carry connection specific descriptors which are defined by RSVP-TE.

Another embodiment for mapping identifier values EGI, MNI and LCD to RSVP-TE signalling objects is based on a separated identifier option. According to the separated identifier option, identifiers defined for asymmetric multipoint calls are detached from identifiers relating to connections. For this separation, further protocol objects carrying the identifiers during call management operations and connection assignment operations are introduced.

A first object introduced for the separated identifier option is a Multipoint Call Session object which is only carrying call identifiers and is only used for call management operations.

The Multipoint Call Session object has the following structure:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    Endpoint    Group    Identifier            |
+-+-+-+-+-+-+-+-+-+-+-+-+-+-+-+-+-+-+-+-+-+-+-+-+-+-+-+-+-+-+-+-+
|    Local    Call    Delimiter          |       MUST  be  zero |
+-+-+-+-+-+-+-+-+-+-+-+-+-+-+-+-+-+-+-+-+-+-+-+-+-+-+-+-+-+-+-+-+
|                          MUST  be  zero                       |
+-+-+-+-+-+-+-+-+-+-+-+-+-+-+-+-+-+-+-+-+-+-+-+-+-+-+-+-+-+-+-+-+
```

The Multipoint Call Session object carries EGI and LCD fields, whereas all further fields are set to zero during sending and are ignored during receipt.

Another operation introduced according to the separated identifier option is a Multipoint Call Sender Template object. The Multipoint Call Sender Template object is defined for call descriptions and is only used for call management operations.

The Multipoint Call Sender Template object has the following structure:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                 Master   Node   ID   (IPv4 address)           |
+-+-+-+-+-+-+-+-+-+-+-+-+-+-+-+-+-+-+-+-+-+-+-+-+-+-+-+-+-+-+-+-+
|   MUST  be  zero                       |      MUST  be  zero  |
+-+-+-+-+-+-+-+-+-+-+-+-+-+-+-+-+-+-+-+-+-+-+-+-+-+-+-+-+-+-+-+-+
```

The Multipoint Call Sender Template object carries a master node ID identifier having a bit length of 32 bit. The other fields of the Multipoint Call Sender Template object have no specific meaning and are set to zero. These fields are also ignored during receiving.

The Multipoint Call Session object and the Multipoint Call Sender Template object are different for point-to-point and point-to-multipoint LSPs. In particular, the objects carry different fields and different values are provided in the fields together with different contexts. Therefore, one-to-one matching cannot always be provided. In order to solve this problem, an object ASSIGN_TO_CALL for carrying the call identifiers in the control messages of the call implementing LSPs is provided.

The ASSIGN_TO_CALL object has the following structure:

In the ASSIGN_TO_CALL object, the call identifiers are registered. For this, a binary format of 11bbbbbb (where "b" are free bits) and a class type set to "1" are provided. Thereby, the ASSIGN_TO_CALL object can be transparently relayed via intermediate nodes of the communication network.

In both the embedded identifier option and the separated identifier option, a Multipoint Call Slave identifier and an Administration Status object may be used.

During call management procedures, the slave nodes have to be distinguished. For this, an identifier for the slave nodes, i.e., a Multipoint Call Slave identifier having the following structure is provided:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  Slave    Node    ID   (IPv4 address)         |
+-+-+-+-+-+-+-+-+-+-+-+-+-+-+-+-+-+-+-+-+-+-+-+-+-+-+-+-+-+-+-+-+
```

Since signalling exchange is only provided between master node and slave nodes, whereas no direct signalling occurs between the slave nodes bypassing the master node, no further fields are required in the Multipoint Call Slave identifier for multipoint call management.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    Endpoint    Group    Identifier            |
+-+-+-+-+-+-+-+-+-+-+-+-+-+-+-+-+-+-+-+-+-+-+-+-+-+-+-+-+-+-+-+-+
|                    Master    Node    Identifier               |
+-+-+-+-+-+-+-+-+-+-+-+-+-+-+-+-+-+-+-+-+-+-+-+-+-+-+-+-+-+-+-+-+
|    Local    Call    delimiter          |      MUST  be  zero  |
+-+-+-+-+-+-+-+-+-+-+-+-+-+-+-+-+-+-+-+-+-+-+-+-+-+-+-+-+-+-+-+-+
```

In case an explicit indication mode is used, the ENCI flag has to be additionally transmitted. For this, ENCI flag "E" can be added to the Administration Status object having the following structure:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|R|                   Reserved                      |E|C|T|A|D|
+-+-+-+-+-+-+-+-+-+-+-+-+-+-+-+-+-+-+-+-+-+-+-+-+-+-+-+-+-+-+-+-+
```

The further flags C, T, A and D of the Administration Status object may be implemented as defined in documents IETF/CCAMP RFC-4974, IETF/CCAMP RFC-3471 and IETF/CCAMP RFC-3473.

In the following, RSVP-TE specific procedures for the above explained master controlled and endpoint controlled asymmetric multipoint call messages are explained. The messages may be transported within the communication network based on RSVP-TE notify messages, as defined in document IETF/CCAMP RFC-4974. Both the embedded and the separated identifier options are supported, however, different Multipoint Call Session objects and Multipoint Call Sender Template objects may be used. The RSVP-TE based implementation may be provided in the communication network shown in FIG. 1.

For the Call Invitation message, the master node has actual EGI, MNI and LCD values available. The EGI, MNI and LCD values may have been generated previously. The master node sends a notify message comprising call related objects. The Multipoint Call Session object carries the EGI and LCD values and the Multipoint Call Sender Template object carries the MNI. Other fields of the objects are set to zero. In particular, the Multipoint Call Slave Identifier object carries the ID of the targeted slave node. The control bits in the Administration Status object are set to C=1 and R=1.

In case a call initiation is performed as part of a master node failure handling procedure, the objects identifying the old call (i.e., Multipoint Call Session objects and Multipoint Call Sender Template) may be embedded in a Referred Multipoint call instance object. On receipt of the RSVP-TE notify message, the slave node parses the message. Based on the content of the multipoint call slave ID, the slave node determines whether it is the destination of a call invitation request. If this is the case, the slave node decides based on local procedures and policies whether it accepts the call invitation request or not. In accordance with the decision, the slave node answers the request which is encoded in another RSVP-TE notify message. The control bits in the Administration Status object are set to C=1 and R=0. The master node receives the response message and thereafter, the slave node is attached to the call.

For the Call Join message, the node intending to become a slave node sends a notify message to the master node. This is similar to the Call Invitation operation, i.e., the C and R bits in the Administration Status object are set to "1". The master node ID is the router ID of the destination node, whereas the slave node ID is the router ID of the initiating node. The EGI and LCD values are known in advance by the initiator node.

The master node receives the message and checks whether the ENCI flag E in the Administration Status object is set. If flag E is set to "1", the call request indicates an explicit indication mode in which the master node assumes that a new multipoint call is to be established. If flag E is set to "0", the call request is treated to indicate an implicit indication mode.

The master node decides whether it accepts or refuses the call request and provides a corresponding response. The response carries the identifier. The control bits in the Administration Status object are set to C=1 and R=0. Accordingly, the node originating the Call Join request becomes a slave node after receipt of a message from the master node indicating acceptance of the Call Join request.

For disconnecting a slave node from a multipoint call based on the Call Disconnect message and for or implementing the Call Leave message, i.e., a slave node triggered call disconnection, signalling based on the Administration Status objects using R, C and D flags can be used.

For the State Synchronization procedure, the master node synchronizes the state of the slave node by only distributing changes of the call state. The master node distributes these changes by embedding the change information in a periodical or a triggered RSVP-TE notify refresh message. The notify refresh message refreshes associations between the master node and the slave nodes. Further messages describing the call state changes may be transported in an Embedded Call State change object. This object may contain the Multipoint Call Slave Identifier object the Administration Status object and all other objects describing the state change, which may be copied from the original message describing the state stage. The Embedded Call State Change object may not carry the Multipoint Call Session object and the Multipoint Call Sender Template object, since the identifiers for these objects are the same.

For adding and removing connections to multipoint calls in both the embedded and the separated identifier option, extensions have to be provided to the RSVP-TE based signalling.

For the embedded identifier option, the same type of Multipoint Call Session objects and Multipoint Call Sender Template objects may be used in both the call management and LSP control messages. The objects may also carry all attributes identifying a call instance. Therefore, no other objects need to be signalled during LSP signalling. For example, an E-TREE connectivity can be implemented with a single multipoint call in that one multicast tree is signalled and additional multicast trees having only one leaf are established by one node. Accordingly, only the master node can initiate an LSP for a call, since the EGI and MNI values are not interchangeable.

For the separated identifier option, new RSVP-TE objects are defined for call managing. Furthermore, connection to call assignment is provided with a new object. Therefore, any kind of LSP signalling may be used and backward compatibility is provided. Moreover, an intermediate node does not have to be capable of decoding an ASSIGN_TO_CALL and only has to forward the ASSIGN_TO_CALL object with a class number being larger than 192. Furthermore, signalling LSPs between slave nodes are allowed in case the slave nodes have knowledge about the identifiers of the other slave nodes.

The master node controlled option with embedded identifiers allows a limited multipoint service support. Route initiated multicast services and rooted multipoint services, (e.g., E-TREE) are supported. In case of E-TREE implementation, if a leaf of the E-TREE wants to join a network service, an additional procedure may be necessary which notifies the master node to extend both the call and the implementing connections. The master node controlled option with dedicated identifiers allows using both point-to-multipoint and point-to-point LSP signalling for network connections. An advantage of both master controlled options is the low signalling complexity.

For the endpoint controlled options with embedded and dedicated identifiers, the nodes are enabled to join the network services, e.g., an E-TREE as a leaf.

The endpoint controlled option with state synchronization and dedicated identifiers supports multipoint services requiring arbitrary connectivity among the endpoint nodes. For example, an E-LAN service can be supported with a single instance.

The asymmetric multipoint call concept described herein provides a single control plane entity. Thereby, a simplified mechanism for supporting multipoint services is provided. In particular, multiple calls may identify the same network service instance. Moreover, since the master node is in charge of the asymmetric multipoint call and has all information regarding the asymmetric multipoint call available, efficient control of the asymmetric multipoint call can be provided. Furthermore, by using the point-to-point connections for an asymmetric multipoint call, multipoint services can be efficiently supported.

It is believed that many advantages of the present invention will be fully understood from the foregoing description and it will be apparent that various changes may be made in the form, construction and arrangement of the exemplary aspects thereof without departing from the scope of the invention or without sacrificing all of its advantages. Because the invention can be varied in many ways, it will be recognized that the invention should only be limited by the scope of the following claims.

The invention claimed is:

1. A method for providing an asymmetric multipoint call between a plurality of network nodes in a communication network supporting Distributed Call and Connection Management (DCM) features, in which functional entities regarding call management and connection management are implemented in the plurality of network nodes of the communication network, wherein the asymmetric multipoint call comprises a first call that is established between a master node and a first slave node and a second call that is established between the master node and a second slave node, and different data is exchanged between the master node and the first slave node and between the master node and the second slave node, the method comprising:
    exchanging call management information for the asymmetric multipoint call between the master node and the first slave node based on the first call;
    exchanging the call management information for the asymmetric multipoint call between the master node and the second slave node based on the second call; and
    excluding the first and the second slave node from directly exchanging call management information relating to the asymmetric multipoint call between each other,
    wherein the call management information comprises identification information uniquely identifying the asymmetric multipoint call.

2. The method of claim 1, wherein the identification information comprises information regarding at least one of the network nodes participating in the asymmetric multipoint call, regarding the master node of the asymmetric multipoint call, and regarding a local identifier of the asymmetric multipoint call.

3. The method of claim 1, wherein the identification information comprises information regarding slave nodes participating in the asymmetric multipoint call.

4. The method of claim 1, further comprising:
    receiving, by at least the first slave node, notifications of changes of the identification information from the master node.

5. The method of claim 1, further comprising:
    receiving, by the first slave node, failure information regarding failure of the master node; and
    sending, from the first slave node, in response to the received failure information call invitation messages including the identification information uniquely identifying the asymmetric multipoint call to network nodes participating in the asymmetric multipoint call.

6. The method of claim 1, further comprising:
    determining whether the first slave node participates in any network connections with other network nodes implementing the asymmetric multipoint call; and
    leaving, by at least the first slave node, the asymmetric multipoint call in case no participation is determined.

7. The method of claim 1, further comprising:
    sending a call join request message to the master node, the message comprising an identifier indicating whether a call, which is independent of the currently provided asymmetric multipoint call, is to be established.

8. The method of claim 1, further comprising:
    receiving, at the master node, a call join request message from a third slave node, the message comprising identification information uniquely identifying a specific asymmetric multipoint call;
    determining, by the master node, whether the received call join request message belongs to the asymmetric multipoint call currently provided; and
    allowing, by the master node, the third slave node to join the currently provided asymmetric multipoint call when it has been determined that the received call join request message belongs to the currently provided asymmetric multipoint call.

9. The method of claim 8, further comprising:
    establishing a third call, which is independent of the currently provided asymmetric multipoint call, between the master node and the third slave node when it has been determined that the received call join request message does not belong to the currently provided asymmetric multipoint call.

10. The method of claim 1, further comprising:
    sending a call invitation message to a fourth slave node, the message comprising identification information uniquely identifying the currently provided asymmetric multipoint call and an identifier indicating whether a call, which is independent of the currently provided asymmetric multipoint call, is to be established.

11. The method of claim 1, further comprising:
    reporting changes of identification information uniquely identifying the symmetric multipoint call to the first and the second slave node.

12. The method of claim 1, further comprising
    sending, from the master node, a call disconnect message for disconnecting the first call to the first slave node;
    receiving, at the master node, a call disconnect refuse message from the first slave node; and
    sending, from the master node, in response to the call disconnect refuse message a connection release message to the first slave node, wherein the connection release message triggers the first slave node to disconnect all connections with other network nodes relating to the asymmetric multipoint call.

13. A method for providing an asymmetric multipoint call between a plurality of network nodes in a communication network supporting Distributed Call and Connection Management (DCM) features, in which functional entities regarding call management and connection management are implemented in a plurality of network nodes of the communication network, wherein the asymmetric multipoint call comprises calls that are established between a master node and multiple slave nodes, and different data is exchanged between the master node and the multiple slave nodes, the method comprising
- exchanging, by a first slave node, call management information for the asymmetric multipoint call with the master node based on a first call established between the master node and the first slave node, the first slave node being one of the multiple slave nodes; and
- excluding the first slave node from directly exchanging call management information relating to the asymmetric multipoint call with one or more other slave nodes participating in the asymmetric multipoint call,
- wherein the call management information comprises identification information uniquely identifying the asymmetric multipoint call.

14. The method of claim 13, further comprising:
receiving, by the first slave node, notifications of changes of the identification information from the master node.

15. The method of claim 13, further comprising:
receiving, by the first slave node, failure information regarding failure of the master node; and
sending, from the first slave node, in response to the received failure information call invitation messages including the identification information uniquely identifying the asymmetric multipoint call to network nodes participating in the asymmetric multipoint call.

16. The method of claim 13, further comprising:
determining whether the first slave node participates in any network connections with other network nodes implementing the asymmetric multipoint call; and
leaving, by the first slave node, the asymmetric multipoint call in case no participation is determined.

17. The method of claim 13, further comprising:
receiving, by the first slave node, a call disconnect message from the master node for disconnecting the first call;
sending, from the first slave node, a call disconnect refuse message to the master node; and
receiving, by the first slave node, a connection release message to from the master node,
wherein the connection release message triggers the first slave node to disconnect all connections with other network nodes relating to the asymmetric multipoint call.

18. A method for providing an asymmetric multipoint call between a plurality of network nodes in a communication network supporting Distributed Call and Connection Management (DCM) features, in which functional entities regarding call management and connection management are implemented in the plurality of network nodes of the communication network, wherein the asymmetric multipoint call comprises that a first call is established between a master node and a first slave node, that a second call is established between the master node and a second slave node, that the first and the second slave node are excluded from directly exchanging call management information relating to an asymmetric multipoint call between each other, and that different data is exchanged between the master node and the first slave node and between the master node and the second slave node, the method comprising:
- exchanging, by the master node, call management information for the asymmetric multipoint call with the first slave node based on the first call; and
- exchanging, by the master node, the call management information for the asymmetric multipoint call with the second slave node based on the second call,
- wherein the call management information comprises identification information uniquely identifying the asymmetric multipoint call.

19. The method of claim 18, further comprising:
sending, from the master node, notifications of changes of the identification information to at least the first slave node.

20. The method of claim 18, further comprising:
receiving, at the master node, a call join request message from a third slave node, the message comprising identification information uniquely identifying a specific asymmetric multipoint call;
determining, by the master node, whether the received call join request message belongs to the asymmetric multipoint call currently provided; and
allowing, by the master node, the third slave node to join the currently provided asymmetric multipoint call when it has been determined that the received call join request message belongs to the currently provided asymmetric multipoint call.

21. The method of claim 20, further comprising:
establishing a third call, which is independent of the currently provided asymmetric multipoint call, between the master node and the third slave node when it has been determined that the received call join request message does not belong to the currently provided asymmetric multipoint call.

22. The method of claim 18, further comprising:
sending, from the master node, a call invitation message to a fourth slave node, the message comprising identification information uniquely identifying the currently provided asymmetric multipoint call and an identifier indicating whether a call, which is independent of the currently provided asymmetric multipoint call, is to be established.

23. The method of claim 18, further comprising:
sending, from the master node, a call disconnect message for disconnecting the first call to the first slave node;
receiving, at the master node, a call disconnect refuse message from the first slave node; and
sending, from the master node, in response to the call disconnect refuse message a connection release message to the first slave node,
wherein the connection release message triggers the first slave node to disconnect all connections with other network nodes relating to the asymmetric multipoint call.

24. A computer program product comprising a non-transitory computer-readable recording medium having a computer readable program embodied therein for performing the method steps according to claim 1, when the computer program product is executed on one or more components of the communication network.

25. A communication network configured to support Distributed Call and Connection Management (DCM) features, in which functional entities regarding call management and connection management are implemented in a plurality of network nodes of the communication network, the communication network comprising:

a first slave node configured to be excluded from directly exchanging call management information relating to an asymmetric multipoint call with another slave node participating in the asymmetric multipoint call;

a second slave node configured to be excluded from directly exchanging call management information relating to an asymmetric multipoint call with another slave node participating in the asymmetric multipoint call; and a master node configured to exchange call management information for an asymmetric multipoint call between the master node and the first slave node based on a first call and to exchange call management information for the asymmetric multipoint call between the master node and the second slave node based on a second call, wherein the asymmetric multipoint call comprises the first call and the second call, and different data is exchanged between the master node and the first slave node and between the master node and the second slave node, wherein the call management information comprises identification information uniquely identifying the asymmetric multipoint call.

26. A slave node configured to participate in an asymmetric multipoint call between a plurality of network nodes in a communication network supporting Distributed Call and Connection Management (DCM) features, in which functional entities regarding call management and connection management are implemented in a plurality of network nodes of the communication network, wherein multiple calls are established between a master node and multiple slave nodes, the slave node comprising:

a communication unit configured to exchange call management information for the asymmetric multipoint call with the master node based on a first call established between the master node and the slave node; and a management unit configured to exclude the slave node from directly exchanging call management information relating to the asymmetric multipoint call with one or more other slave nodes participating in the asymmetric multipoint call, wherein the asymmetric multipoint call comprises the multiple calls, and different data is exchanged between the master node and the multiple slave nodes, wherein the call management information comprises identification information uniquely identifying the asymmetric multipoint call.

27. The slave node of claim 26, wherein the communication unit is configured to receive changes of the identification information from the master node.

28. A master node configured to participate in an asymmetric multipoint call between a plurality of network nodes in a communication network supporting Distributed Call and Connection Management (DCM) features, in which functional entities regarding call management and connection management are implemented in a plurality of network nodes of the communication network, wherein a first call is established between the master node and a first slave node, a second call is established between the master node and a second slave node, and the first and the second slave nodes are excluded from directly exchanging call management information relating to the asymmetric multipoint call between each other, the master node comprising:

a communication unit configured to exchange call management information for the asymmetric multipoint call with the first slave node based on the first call and to exchange call management information for the asymmetric multipoint call with the second slave node based on the second call, wherein the asymmetric multipoint call comprises the first call and the second call, and different data is exchanged between the master node and the first slave node and between the master node and the second slave node, wherein the call management information comprises identification information uniquely identifying the asymmetric multipoint call.

29. The master node of claim 28, further comprising:

a receiving unit configured to receive a call join request message from a third slave node, the message comprising information uniquely identifying a specific asymmetric multipoint call;

a determination unit configured to determine whether the received call join request message belongs to the currently provided asymmetric multipoint call; and a management unit configured to allow the third slave node to join the currently provided asymmetric multipoint call when it has been determined that the received call join request message belongs to the currently provided asymmetric multipoint call.

30. A method performed by a master node of a communication network, the communication network comprising the master node and at least first and second slave nodes, the method comprising:

establishing, by the master node, an asymmetric multipoint call,
the asymmetric multipoint call being based on an association among at least the master node, the first slave node, and the second slave node including an association of at least first and second calls,
the first call being a first connection established between the master node and the first slave node, the first connection being capable of defining a multipoint network service instance, and
the second call being a second connection established between the master node and the second slave node, the second connection being capable of defining the same multipoint network service instance; and exchanging, by the master node, call management information for the asymmetric multipoint call with the first and second slave nodes,
the call management information with the first slave node being exchanged based on the first call, and
the call management information with the second slave node being exchanged based on the second call,
wherein the first and second slave nodes are prevented from exchanging the call management information directly with each other.

31. The method of claim 30, wherein the call management information uniquely identifies the asymmetric multipoint call established by the master node.

* * * * *